Jan. 27, 1959 F. MUGELE 2,871,404
CIRCUIT FOR DISPLAYING ULTRASONIC ENERGY SIGNALS
Filed March 2, 1955
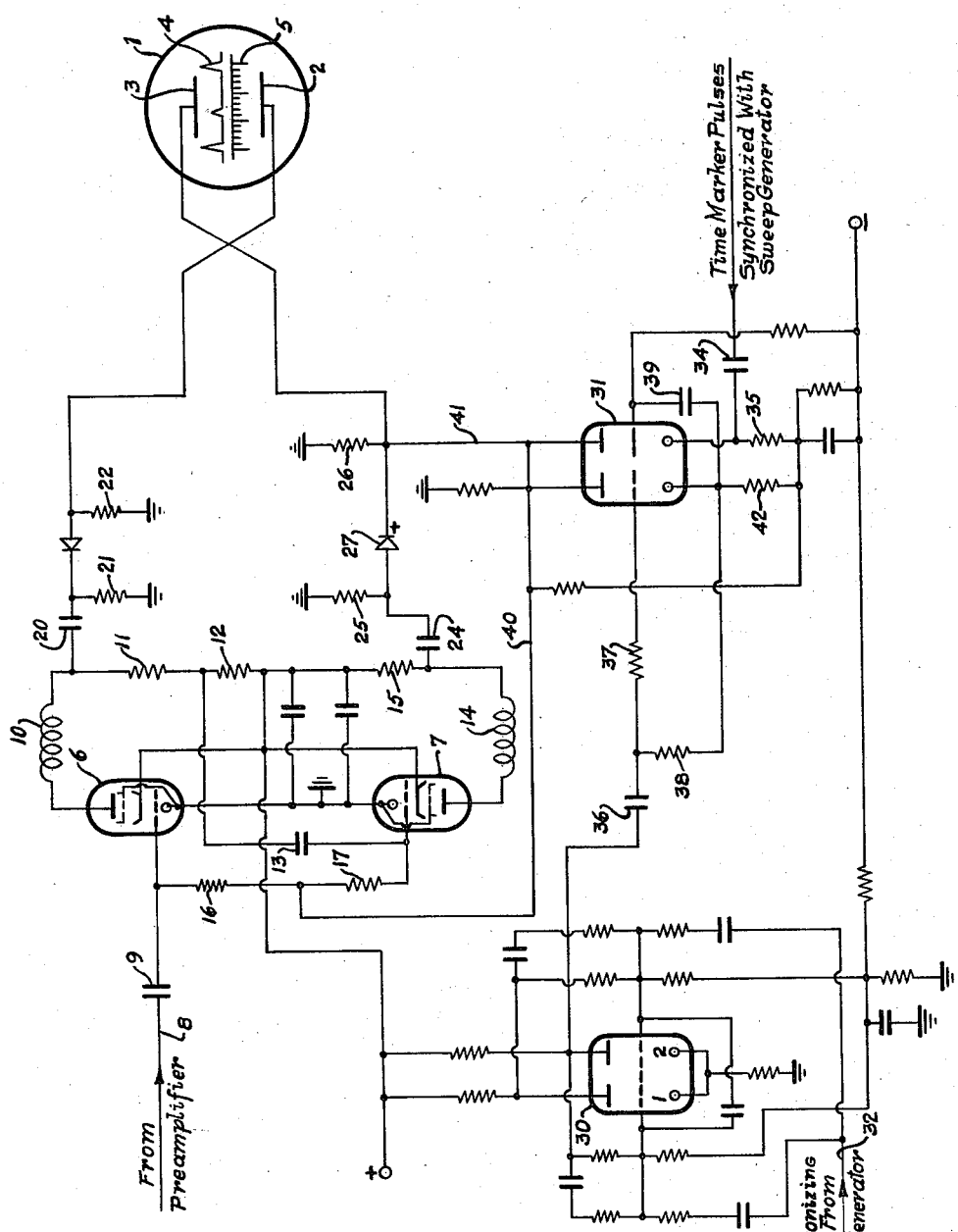
INVENTOR
FRIEDRICH MUGELE
BY
AGENT

United States Patent Office 2,871,404
Patented Jan. 27, 1959

2,871,404

CIRCUIT FOR DISPLAYING ULTRASONIC ENERGY SIGNALS

Friedrich Mugele, Heppenheim-Bergstrasse, Germany, assignor to Dr. Lehfeldt & Company, G. m. b. H., Heppenheim-Bergstrasse, Germany, a German corporation Application March 2, 1955, Serial No. 491,598

5 Claims. (Cl. 315—26)

This invention relates to apparatus for non-destructive testing of materials by means of ultrasonic energy. The invention relates particularly to apparatus in which ultrasonic energy imparted to material under test is displayed on the screen of a cathode ray tube, as well as the energy reflected from defects in the material, which are to be detected. It further relates to such apparatus in which a time scale is also displayed on the screen of a cathode ray tube, consisting of discrete markers, so that a time or depth scale is provided together with the display of transmitted and reflected ultrasonic energy.

In ultrasonic non-destructive material testing, relatively short bursts of ultrasonic energy, usually having a frequency in the order of between one-tenth and several megacycles per second, are imparted to a piece of material under test, which may or may not be metallic, and such energy is reflected by inhomogeneities or defects in the material under test. Generally a coarse crystal is used to generate the ultrasonic energy by conversion of electrical into mechanical energy, and this same crystal acoustically closely coupled to the test piece, is also used to convert reflected ultrasonic energy into electrical signals. These signals are displayed on the luminescent screen of a cathode tube by applying them, for example, to the vertical deflecting plates of such a tube, while a linear sweep signal is applied to the horizontal deflecting plates. In this manner, a time trace of the transmitted and reflected ultrasonic energy is produced.

In specific materials ultrasonic energy travels with velocities characteristic of the material. Hence, a measurement of the time elapsed between transmission of a burst of ultrasonic energy and reception of a reflected portion thereof, permits the location of an inhomogeneous or defective spot in the test piece.

For this purpose a second trace can be provided on the screen of the cathode ray tube consisting of a periodic wave of known frequency, such as a square wave or a series of relatively narrow pulses. This display therefore provides a time scale for the energy display and, since the speed of travel of the energy in the material is known, also provides a depth scale.

In apparatus of this type known hitherto, an electron beam of a cathode ray tube has been deflected alternately in accordance with ultrasonic energy signals and time signals, respectively. Because of the persistence of the luminescent screen of the cathode ray tube, both the energy and time marker traces appear on top of each other and, consequently, this gives rise to confusion in the interpretation of the energy trace.

It is an object, therefore, of the present invention to provide improved apparatus in which energy traces and time marker traces are displayed separately so as to avoid overlapping thereof and to make possible a more reliable interpretation of the energy trace.

A further object of the invention is to provide a new and improved circuit arrangement for reliable and separate display of energy traces and time marker traces.

In accordance with the present invention, there is provided a means for visually displaying the relation of the magnitude of ultrasonic energy with respect to time, and means for displaying on the last named means markers having a pre-determined time relation. Means are further provided for separating in space the displays of the ultrasonic energy and the time markers, thereby to provide an undisturbed and clear display of the ultrasonic energy.

Further in accordance with the present invention, a circuit arrangement is provided including an amplifier for amplifying signals representative of vibratory or ultrasonic energy. A first means is provided for deflecting an electron beam across a luminescent screen in a cathode ray tube in accordance with a magnitude of the vibratory energy to produce a time trace of this energy. A second means is provided for deflecting the electron beam in accordance with time markers to produce a traced scale of time, and means for alternately deflecting the electron beam in accordance with the vibratory energy and the time markers. Finally, means are provided coupled to the aforesaid first means for causing the energy trace and the time trace to appear on separate adjacent areas of the luminescent screen of the cathode ray tube.

For a better understanding of the invention, together with other and further objects thereof, reference is had to the following description taken in connection with the accompanying drawing and its scope will be pointed out in the appended claims.

The accompanying drawing schematically shows a circuit diagram in accordance with the present invention, for producing separate and adjacent traces on the luminescent screen of a cathode ray tube, representative of a transmitted and reflected vibratory energy and time or depth, respectively.

Referring now more particularly to the accompanying drawing, there is schematically indicated a luminescent screen 1 of a cathode ray tube together with electrostatic deflecting plates 2 and 3, for vertical deflection of the electron beam of the cathode ray tube. The luminescent traces of vibratory energy and time markers are shown at 4 and 5 respectively.

For the purpose of producing a display of vibratory energy on screen 1, there is provided a vibratory signal amplifier including tubes 6 and 7, connected in a so-called push-pull circuit, with a single ended input. Such circuits, per se, are well known to those skilled in the art. For applying signals representative of the magnitude of vibratory energy whose frequency is in the order of between about one-tenth to several megacycles per second there is provided a signal lead 8 connected by way of an input capacitor 9 to the control grid of tube 6. The anode circuit of tube 6 includes an inductance element 10 and plate load resistors 11 and 12. For the purpose of applying a signal to the control grid of tube 7, the portion of the amplified signal of tube 6 appearing across resistor 12 is applied through coupling capacitor 13 to the control grid of tube 7. This tube has in its anode circuit an inductance element 14 and a plate load resistor 15. Connected in the control grid circuits of tubes 6 and 7 are grid leak resistors 16 and 17, whose function will be explained later.

As will be apparent to those skilled in the art, amplified high frequency signals of opposite phase appear across the combination of resistors 11 and 12 and resistor 15, respectively, in accordance with the high frequency signal applied to signal lead 8.

For rectifying or demodulating the high frequency signals appearing across the combination of resistors 11 and 12, there is provided a circuit including a coupling capacitor 20, resistors 21 and 22, and a rectifier 23, preferably a crystal diode, connected as shown and coupled to deflecting plate 2.

Similarly, for demodulating the high frequency signals appearing across resistor 15 there is provided a circuit including a reflecting capacitor 24, resistors 25 and 26, and a rectifier 27, all connected as shown and coupled to deflecting plate 3.

For alternately producing a luminescent trace of the vibratory energy and of the timing markers, respectively, there are provided two circuit portions including a multivibrator circuit with a twin triode tube 30 and a time marker amplifier and control circuit including a twin triode 31.

Tube 30 is connected in a multivibrator circuit of conventional design, adapted to produce at one or both of the anodes of tube 30 a symmetrical square wave signal. For synchronizing the operation of this multivibrator circuit there is provided a signal lead 32 adapted to receive synchronizing pulses derived from the sweep generator used to produce the horizontal sweep or deflection of the electron beam of the cathode ray tube including luminescent screen 1. The synchronizing pulses are of the same frequency as the sweep frequency and are adapted to cause the multivibrator to oscillate in a so-called "flip-flop" fashion, so as to produce a square wave signal of one-half the frequency of the applied synchronizing signals.

Tube 31 comprises two triode sections, the right hand section of which serves to amplify received time marker signals, whereas the left hand side of which serves to control the operation of the push-pull amplifier including tubes 7 and 8, that is, to suppress the amplification of high frequency signals during pre-determining intervals and to cause amplification by the push-pull amplifier of the multivibrator output signal, thereby to provide a vertical displacement of the energy trace with respect to the time trace on screen 1, as will be explained below.

For the purpose of amplifying time marker signals, there is provided a signal input lead 33 coupled by way of a capacitor 34 to a cathode resistor 35, connected to the cathode of the right-hand triode section of tube 31. Signal lead 33 is adapted to receive time marker signals derived from the sweep generator (not shown). These time markers have a frequency which is a multiple of the sweep frequencies.

Coupling between the multivibrator including tube 30 and tube 31 is achieved by means of a coupling capacitor 36, connected by way of a resistor 37 to the control grid of the left-hand triode section of tube 31. Coupling condenser 36 is also connected by way of a resistor 38, a resistor 42, and a capacitor 39, to the control grid of the right-hand triode section of tube 31. In this manner signals appearing across resistor 42 in accordance with the multivibrator square wave, are applied to the control grid of the right-hand triode section of tube 31.

For controlling the signal amplifier in accordance with the square wave signal, generated by the multivibrator and amplified by the left-hand triode section of tube 31, there is provided a connection 40 between anode of this triode section and the junction point of grid resistors 16 and 17 of the push-pull amplifier circuit.

For producing the time marker trace 5 on screen 1, there is provided a connection 41 between the anode of the right-hand triode section of tube 31 and resistor 26, as shown.

In operation, a quartz crystal converts electrical signals into vibratory energy applied to a test piece and converts reflected energy into electrical signals. After preamplification, these signals are applied to signal lead 8 and the control grid of tube 6. An amplified high frequency signal appears across the combination of resistors 11 and 12. The portion of the amplified signal appearing across resistor 12 is applied through capacitor 13 to the control grid of tube 7 and produces an amplified high frequency signal across resistor 15, which is substantially the same magnitude as the amplified signal across resistors 11 and 12 but of opposite phase. The signal across resistors 11 and 12 is applied through capacitor 20 to the cathode of diode 23, so that a rectified voltage representative of the envelope of the high frequency signals appears across resistor 22 with a negative polarity and a magnitude representative of the amplitude of the high frequency signals before rectification. Because of the polarity of diode 23, only negative half waves of the high frequency signal are rectified.

Similarly, high frequency signals across resistor 15 are rectified by diode 27 to produce positive signals across resistor 26, whose magnitude is in accordance with the amplitude of the amplified high frequency signals. Because of the polarity of diode 27, only positive half waves of the applied high frequency signal are rectified. Rectified signals appearing across resistor 22 are applied to deflecting plate 2 and, since these signals are negative, produce an upward deflection of the trace with increasing magnitude of received high frequency signals. Rectified signals appearing across resistor 26 are applied to deflecting plate 3, and since these signals are of positive polarity, they produce an upward deflection of the trace in accordance with increasing amplitude of the amplified high frequency signals. In this manner, trace 4 is produced of which the various peaks represent transmitted and reflected bursts of ultrasonic energy.

The multivibrator, including tube 30, generates, as mentioned above, a symmetrical square wave with a frequency equal to one-half of the frequency of the sweep signal used for horizontal deflection of the electron beam in the cathode ray tube including screen 1.

During the negative half cycle of the multivibrator square wave the left-hand triode section of tube 31 is cut off by virtue of the negative potential applied to its control grid. Since no cathode current then flows through resistor 42, a negative potential from the same source is also applied through resistor 38 and capacitor 39 to the control grid of the right-hand triode section of tube 31, thus also cutting off this section. Hence, during the negative half cycle of the multivibrator square wave, the circuit including tube 31 is substantially inoperative and the push-pull amplifier including tubes 6 and 7 operates as if it were not coupled to this circuit and amplifies the applied high frequency signals to produce trace 4, as explained above.

During the positive half cycle of the multivibrator square wave, the left-hand triode section of tube 31 becomes conducting, its anode assumes a negative potential with respect to ground, which is applied by way of signal lead 40 and grid resistors 16 and 17 to the control grids of tubes 6 and 7, respectively. Tube 6 is substantially cut off and therefore the potential at the junction point of resistor 11 and capacitor 20 reaches its maximum positive value. A portion of this positive potential, appearing across resistor 12, is reflected by way of capacitor 13 to the control grid of tube 7, and substantially or partially counteracts the negative potential applied to its control grid by way of the signal lead 40. Hence, the change in the current drawn by tube 7, during this period, is substantially less than the change in the anode current of tube 6. Ideally, there would be no change in the anode current of tube 7.

Whereas, it has just been explained that the junction point of elements 11 and 20 is highly positive during the time when tube 6 is cut off by the negative half wave of the applied multivibrator signal, the potential of this junction point is less positive during the positive half wave of the multivibrator output signal by virtue of the steady D.-C. component of the anode current which flows during normal amplifier operation. Hence, a square wave corresponding to the multivibrator output signal is produced across resistor 21, which has its positive half wave when the amplifier tube 6 is cut off, and its negative half wave when tube 6 is conducting. Because of the polarity of diode 23, it passes current only during the negative half wave and produces across resistor 22 a negative potential during this time. This potential is applied to deflecting plate 2 and causes an upward vertical displacement of the energy trace 4.

Since little or no change in anode current of tube 7 occurs in accordance with the multivibrator output signal, at least as compared with the change in anode current of tube 6, there is no significant vertical displacement of the traces by the anode potential of tube 7.

As explained above, a vertical upward shift of the energy trace is achieved, whereas the time marker trace does not suffer a vertical shift. Since the high-frequency signals representative of vibratory energy are demodulated and produced an upward cathode ray beam deflection with increasing magnitude, and because time markers cause a downward deflection, as shown by traces 4 and 5, relatively little separation of the zero-signal lines is required to produce adjacent but non-overlapping traces. Such traces can be clearly distinguished and are easily interpreted.

During the positive half wave of the multivibrator output signal, the right-hand triode section of tube 31 is also rendered conducting and applies time marker signals received through lead 33, to resistor 26 by way of signal lead 41. An increase in anode current of the right-hand triode section of tube 31 produces a negative voltage drop across resistor 26 which is applied to deflecting plate 3, thus causing a downward deflection of the electron beam in accordance with timing markers.

Whereas my invention has been described in connection with ultrasonic energy having a frequency in the range between one-tenth to several megacycles per second, it is obvious to those skilled in the art, that it is equally applicable to other frequencies should their use be advantageous, and the scope of my invention is not limited to the use of any particular vibratory frequency as long as it is substantially higher than the sweep frequency used for horizontal deflection of the electron beam in the cathode ray tube and the multivibrator signal synchronized therewith.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an oscilloscope arrangement having a luminescent screen, an electron beam for displaying electrical signals on the luminescent screen, and at least one pair of spaced deflection plates for varying the position of the electron beam, in combination, amplifying means having an input adapted to receive the electrical signals to be displayed and having an output circuit connected to the deflection plates for applying amplified output signals thereto, said amplifying means including at least two electron beam shifting circuits; switching means having an input circuit adapted to receive a series of spaced reference pulses and having an output circuit connected to the deflection plates, said switching means being operable between a circuit opening position wherein said spaced reference pulses are applied to said deflection plates and displayed, and a circuit blocked position wherein said spaced reference pulses are blocked and not displayed; and control means connected to said amplifying means and to said switching means for operating said switching means into said circuit blocking position for a first preselected time interval during which any electrical signals applied to said amplifying means are amplified and applied to said deflection plates, and for operating said switching means into said circuit opening position for a second preselected time interval during which any electrical signals applied to said amplifying means are blocked, said control means including means for rendering both of said electron beam shifting circuits operative during said first preselected time interval, and for rendering at least one of said shifting circuits inoperative during said second preselected time interval.

2. In an oscilloscope arrangement having a luminescent screen, an electron beam for displaying electrical signals on the luminescent screen, and at least one pair of spaced deflection plates for varying the position of the electron beam, in combination, push-pull amplifying means having an input adapted to receive the electrical signals to be displayed and having an output circuit connected to the deflection plates for applying amplified output signals thereto, said push-pull amplifying means including at least two electron beam shifting circuits; switching means having an input circuit adapted to receive a series of spaced reference pulses and having an output circuit connected to the deflection plates, said switching means being operable between a circuit opening position wherein said spaced reference pulses are applied to said deflection plates and displayed, and a circuit blocked position wherein said spaced reference pulses are blocked and not displayed; and multivibrator control means connected to said amplifying means and to said switching means for operating said switching means into said circuit blocking position for a first preselected time interval during which any electrical signals applied to said amplifying means are amplified and applied to said deflection plates, and for operating said switching means into said circuit opening position for a second preselected time interval during which any electrical signals applied to said amplifying means are blocked, said multivibrator control means including means for rendering both of said electron beam shifting circuits operative during said first preselected time interval, and for rendering at least one of said shifting circuits inoperative during said second preselected time interval.

3. In an oscilloscope arrangement having a luminescent screen, an electron beam for displaying electrical signals on the luminescent screen, and at least one pair of spaced deflection plates for varying the position of the electron beam, in combination, amplifying means having an input adapted to receive the electrical signals to be displayed and having a first output circuit connected to one of the deflection plates and arranged to transmit thereto solely negative going portions of the amplified output signals, said amplifying means having a second output circuit connected to the other of the deflection plates and arranged to transmit thereto solely positive going portions of the amplified output signals; switching means having an input circuit adapted to receive a series of spaced reference pulses and having an output circuit connected to the deflection plates, said switching means being operable between a circuit opening position wherein said spaced reference pulses are applied to said deflection plates and displayed, and a circuit blocked position wherein said spaced reference pulses are blocked and not displayed; and control means connected to said amplifying means and to said switching means for operating said switching means into said circuit blocking position for a first preselected time interval during which any electrical signals applied to said amplifying means are amplified and applied to said deflection plates, and for operating said switching means into said circuit opening position for a second preselected time interval during which any electrical signals applied to said amplifying means are blocked, said control means including means for rendering both of said output circuits of said amplifying means operative during said first preselected time interval, and for rendering at least one of said output circuits of said amplifying means inoperative during said second preselected time interval.

4. In an oscilloscope arrangement having a luminescent screen, an electron beam for displaying electrical signals on the luminescent screen, and at least one pair of spaced deflection plates for varying the position of the electron beam, in combination, amplifying means having an input adapted to receive the electrical signals to be displayed and having an output circuit connected to the deflection plates for applying amplified output signals thereto, said amplifying means including at least two electron beam shifting circuits; switching means having an input circuit adapted to receive a series of spaced reference pulses and having an output circuit connected to the deflection plates, said switching means being operable between a circuit opening position wherein said spaced reference pulses are applied to said deflection plates and displayed, and a circuit blocked position wherein said spaced reference pulses are blocked and not displayed; and multivibrator control means for producing a series of output signals having alternate and sequential positive going and negative going portions and being connected to said amplifying means and to said switching means for operating said switching means into said circuit blocking position during one of said portions of said output signals during which any electrical signals applied to said amplifying means are amplified and applied to said deflection plates, and for operating said switching means into said circuit opening position during the other of said portions of said output signals during which any electrical signals applied to said amplifying means are blocked, said control means including means for rendering both of said electron beam shifting circuits operative during said one of said portions of said output signals, and for rendering at least one of said shifting circuits inoperative during said other of said portions of said output signals.

5. In an oscilloscope arrangement having a luminescent screen, an electron beam for displaying electrical signals on the luminescent screen, and at least one pair of spaced deflection plates for varying the position of the electron beam, in combination, amplifying means having an input adapted to receive the electrical signals to be displayed and having a first output circuit connected to one of the deflection plates and arranged to transmit thereto solely negative going portions of the amplified output signals, said amplifying means having a second output circuit connected to the other of the deflection plates and arranged to transmit thereto solely positive going portions of the amplified output signals; switching means having an input circuit adapted to receive a series of spaced reference pulses and having an output circuit connected to the deflection plates, said switching means being operable between a circuit opening position wherein said spaced reference pulses are applied to said deflection plates and displayed, and a circuit blocked position wherein said spaced reference pulses are blocked and not displayed; and multivibrator control means for producing a series of output signals having alternate and sequential positive going and negative going portions and being connected to said amplifying means and to said switching means for operating said switching means into said circuit blocking position during one of said portions of said output signals during which any electrical signals applied to said amplifying means are amplified and applied to said deflection plates, and for operating said switching means into said circuit opening position during the other of said portions of said output signals during which any electrical signals applied to said amplifying means are blocked, said control means including means for rendering both of said output circuits of said amplifying means operative during said one of said portions of said output signals, and for rendering at least one of said output circuits of said amplifying means inoperative during said other of said portions of said output signals.

References Cited in the file of this patent

UNITED STATES PATENTS

| | | |
|---|---|---|
| 2,146,862 | Shumard | Feb. 14, 1939 |
| 2,280,226 | Firestone | Apr. 21, 1942 |
| 2,426,989 | De Rosa | Sept. 9, 1947 |
| 2,448,363 | Firestone et al. | Aug. 31, 1948 |
| 2,471,530 | Lobel | May 31, 1949 |
| 2,512,923 | Dippy | June 27, 1950 |
| 2,542,275 | Ekstein | Feb. 20, 1951 |
| 2,706,265 | Buehler | Apr. 12, 1955 |